United States Patent Office 3,012,063
Patented Dec. 5, 1961

3,012,063
PHENYL 3,5-DIBENZOYL-β-RESORCYLATE
George G. Roller, Midland, Mich., assignor to The Dow Chemical Company, Midland, Mich., a corporation of Delaware
No Drawing. Filed Sept. 19, 1958, Ser. No. 761,927
1 Claim. (Cl. 260—473)

This invention relates to an organic chemical compound, phenyl 3,5-dibenzoyl-β-resorcylate, having the formula:

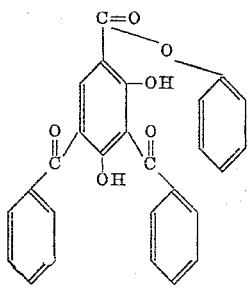

This compound may be prepared by heating a mixture of 3,5-dibenzoyl-β-resorcylic acid, phenol, and phosphoryl chloride, and maintaining the reaction mixture at or above 130° C. for approximately two hours. Preferably, the temperature should be kept at 150° C. Additional phosphoryl chloride is then added and the reaction mixture heated one additional hour at 150° C. The reaction mixture is then cooled and the excess phenol removed. The solid which results is separated by filtration, washed successively with aqueous sodium hydroxide solution, methanol, cyclohexane, and ethanol. Recrystallization of the solid from a mixture of benzene, ethanol and monochlorobenzene generally results in white crystals, melting at 181.0 to 182.2° C.

The following example is given to illustrate the present invention, but is not to be construed as limiting.

Example

Three hundred and sixty-two (362) grams (1.0 mole) of 3,5-dibenzoyl-β-resorcylic acid, 471 grams (5.0 moles) of phenol, and 77 grams (0.5 mole) of phosphoryl chloride were heated at 150° C. for two hours. Twenty-five (25) additional grams of phosphoryl chloride were added and the mixture heated for one additional hour. The excess phenol was removed by distillation under a pressure of 40 millimeters of mercury absolute, the reaction mixture cooled, poured into two liters of 10 percent aqueous sodium hydroxide solution, and filtered. The remaining product was then washed successively with 10 percent aqueous sodium hydroxide solution, twice with methanol, then with cyclohexane, and finally with ethanol. Recrystallization of the solid from a mixture of benzene, ethanol, and monochlorobenzene yielded white crystals of phenyl 3,5-dibenzoyl-β-resorcylate, which melted at 181.0–182.2° C.

Analysis:
Calculated _____ C, 73.96; H, 4.14
Found _____ C, 73.61; H, 4.14

The 3,5-dibenzoyl-β-resorcylic acid used as the starting material in the aforementioned example, was prepared as follows:

A mixture of 770 grams (5.0 moles) of β-resorcylic acid, 2133 grams (16.0 moles) of aluminum chloride, and 2.5 liters of 1,3,4-trichlorobenzene was heated to 130° C. 1540 grams (11.0 moles) of benzoyl chloride in 770 grams of 1,3,4-trichlorobenzene were added then over a period of 1½ hours and the mixture was heated an additional hour at about 130° C. The reaction complex and aluminum chloride were then destroyed by adding 3 normal hydrochloric acid to the hot mixture, the mixture stirred until decomposition was complete, and then cooled and filtered. This filtered product was then washed three times with two liter portions of Skellysolve having a boiling point between 35° C. and 60° C., with cold trimethylpentane and with boiling trimethylpentane. The product was then taken up in 10 percent aqueous sodium hydroxide solution, filtered, and washed with methanol. Recrystallization from methanol yielded 1013 grams (69 percent of the theoretical yield) of white crystals of 3,5-dibenzoyl-β-resorcylic acid, melting at 234.8° to 236.0° C.

The compound of the present invention is useful as a light stabilizer when conventionally incorporated into a copolymer of 85 percent vinylidene chloride and 15 percent vinyl chloride (generally known as a Saran-type polymer).

Various modifications may be made in the method of the present invention, without departing from the spirit or scope thereof, and it is to be understood that I limit myself only as defined in the appended claim.

I claim:
Phenyl 3,5-dibenzoyl-β-resorcylate.

References Cited in the file of this patent

Desai et al.: Chem. Abstracts 34, 7874–5 (1940).
"Organic Syntheses," vol. 32, pages 25 and 26, J. Wiley, 1952.